US006988035B2

(12) United States Patent
Slickers

(10) Patent No.: US 6,988,035 B2
(45) Date of Patent: Jan. 17, 2006

(54) METHOD OF DETERMINING DRIVING ROUTES

(75) Inventor: Dirk Slickers, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 10/452,854

(22) Filed: Jun. 2, 2003

(65) Prior Publication Data
US 2004/0032344 A1  Feb. 19, 2004

(30) Foreign Application Priority Data
Jun. 15, 2002 (DE) ................. 102 26 686

(51) Int. Cl.
*G01C 21/32* (2006.01)
*G08G 1/123* (2006.01)
(52) U.S. Cl. .................. 701/209; 701/210; 340/995.19
(58) Field of Classification Search ............... 701/200, 701/209; 340/995.19
See application file for complete search history.

(56) References Cited

U.S. PATENT DOCUMENTS

| 6,144,920 | A | * | 11/2000 | Mikame ..................... 701/212 |
| 6,542,812 | B1 | * | 4/2003 | Obradovich et al. ........ 701/207 |
| 6,661,353 | B1 | * | 12/2003 | Gopen ......................... 340/973 |
| 6,807,480 | B1 | * | 10/2004 | Iwasaki et al. ............. 701/209 |
| 2003/0105585 | A1 | * | 6/2003 | Ukita .......................... 701/211 |

FOREIGN PATENT DOCUMENTS

EP  346 483  12/1989

* cited by examiner

Primary Examiner—Thomas G. Black
Assistant Examiner—Christine M. Behncke
(74) Attorney, Agent, or Firm—Kenyon & Kenyon

(57) ABSTRACT

A method of determining the driving route of a vehicle using a navigation system, a method of entering a destination on a navigation device, as well as a device to perform the methods, using which the destination input is simplified. Approaching infrastructure facilities through input using predefined keys or touch-sensitive fields, the driving route being established as a function of the automatically determined, instantaneous vehicle position. Entering the administrative area in which the infrastructure facility is located is no longer necessary.

6 Claims, 3 Drawing Sheets

METHOD OF DETERMINING DRIVING ROUTES

FIELD OF THE INVENTION

The present invention relates to a method of determining the driving route of a vehicle using a navigation system.

BACKGROUND INFORMATION

In the case of conventional navigation devices, the driving route is calculated in such a way that first a city is selected and subsequently a street or the downtown area is determined as the destination.

European Patent No. 346 483 describes a destination input, according to which first a region is entered by the user and subsequently a destination is selected automatically in the region from a plurality of destinations.

In the above-named driving route calculations the fact that in each case the city, where the destination lies, has to be entered, is of disadvantage; entering the exact destination is necessary, as well.

Based on the known related art, an underlying object of the present invention is to provide a method of determining the driving route of a vehicle and a destination input, whereby the driver is relieved as much as possible.

SUMMARY OF THE INVENTION

By automatically assigning a close destination entered to a corresponding close destination of the administrative area in which the vehicle is located at the time of entering the close destination, a significant simplification results with regard to determining the driving route, as well as to entering the destination. After entering the close destination the vehicle's position is automatically determined, so that based on the determined position of the vehicle, it is recognized and assigned to a determined administrative area, a city or a county, for example. After entering the close destination, the driving route to the respective close destination in the instantaneously located administrative area is subsequently determined automatically.

A close destination is understood here in particular as a destination reappearing in multiple administrative areas, for example cities or counties. These are in particular the downtown area, a train station, hospital, theater, freeway junction, airport, or sports facilities. Generally speaking, close destinations are mainly infrastructure facilities existing in several administrative areas and of particular interest to users of navigation devices in vehicles.

Advantageously, the close destination is entered via symbol keys or selection fields of a menu structure or by providing a street name or the name of an infrastructure facility. Entering via symbol keys or selection fields of a menu structure has the advantage that only one key or active area of a touch screen, that is a screen having a touch-sensitive surface, must be actuated to allow for a route to be calculated to the desired destination. In order to avoid a limitation to a finite number of infrastructure facilities predetermined by the screen size, in a preferred embodiment the particular name is entered via a character sequence. It is further possible to store frequent street names and to retrieve them by pressing the appropriate key or to enter only a street name without first having to enter the city or locality, since the latter will already be determined via position determination.

A refinement of the method provides for establishing the driving route for the nearest close destination. As an alternative to the distance-oriented driving route, it is possible to define a route to a close destination to be reached fastest. This is of advantage in particular for the close destination "hospital."

In the event a non-unambiguous close destination is recognized or an appropriate close destination is not stored in the database of the navigation device, a query will be advantageously conducted regarding the final selection in order to be able to perform the correct selection of the close destination. Advantageously, in the case of a non-unambiguously entered close destination and/or in the case of a final determination of the close destination, feedback is provided via an acoustic output device.

In the case of a selection from several possible close destinations the query will be advantageously conducted to find out, in which direction, viewed from the instantaneous position of the vehicle, the desired close destination is located. Thus, a selection is made from several possibilities in a simple way, using no complicated input.

In the event the position of the vehicle is located in a boundary area of an administrative area, a query regarding the desired administrative area is provided, which is of advantage in particular in densely populated areas.

A further refinement is designed to establish the driving route that lies along a stretch having a plurality of parking options, so the driver is able to find parking easily in the vicinity of the desired destination.

In order to be able to guarantee universal implementability of an appropriate navigation device, the method is only performed via close destination input if a corresponding mode of operation has been set on the navigation device. This means that corresponding touch screen areas are not or are otherwise laid out in the conventional mode and are laid out with the corresponding symbol keys or selection menus in the close destination input mode.

By entering the destination on a navigation device via predefined keys or touch-sensitive fields for infrastructure facilities, destination input is simplified substantially, since only a few keys, ideally one key, must be actuated in order to define the desired destination. The driving route is subsequently calculated as described above.

The device for performing a method according to one of the preceding claims features predefined keys or selection fields having infrastructure facilities displayed graphically and/or described by text, which are laid out independently of an administrative area, so they are universally applicable and the driving route to the respectively selected destinations is calculated as a function of the instantaneously determined position within a particular administrative area.

DETAILED DESCRIPTION

Figure 1:
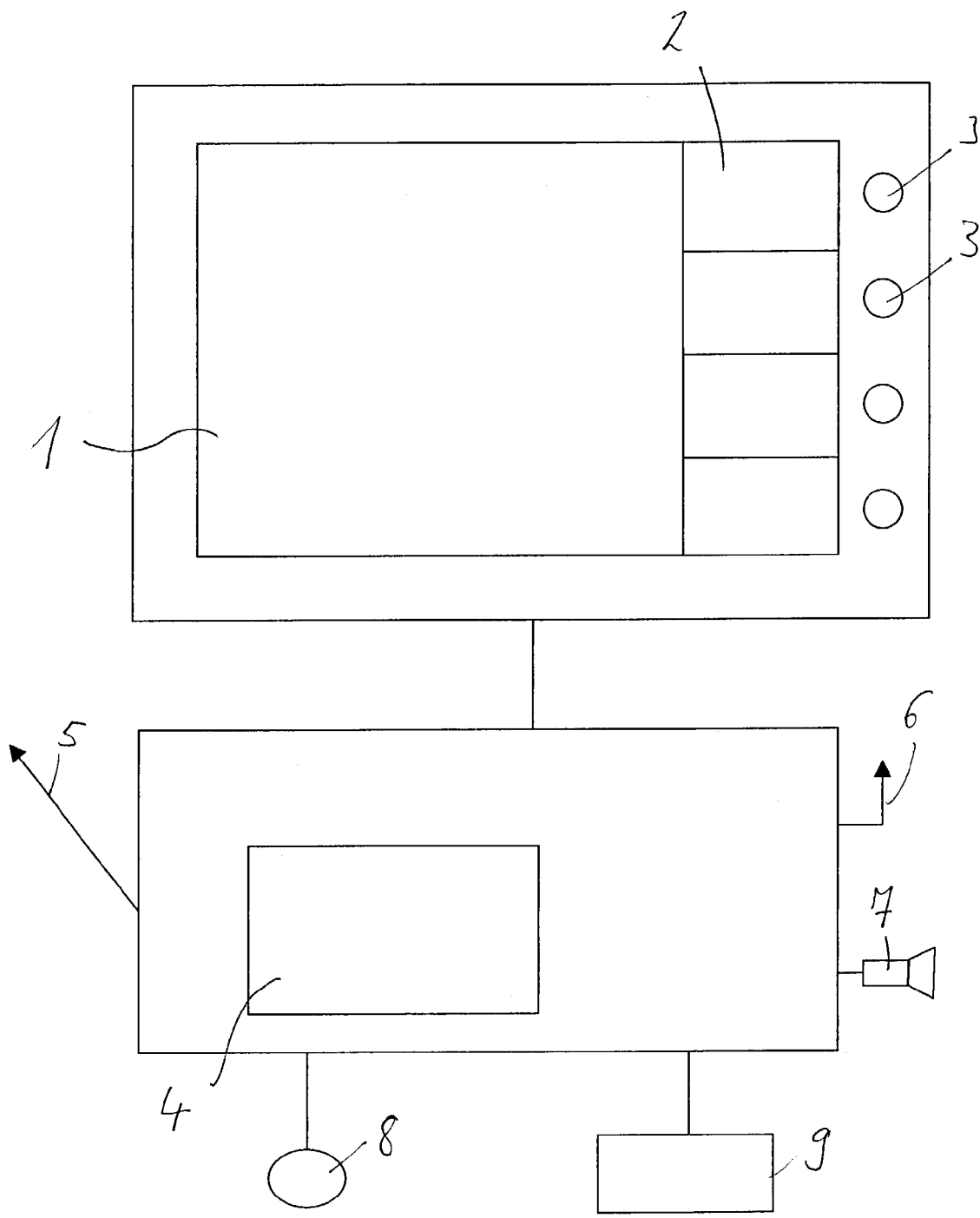
FIG. 1 shows a schematic drawing of the navigation device.

Preferably on a center console of a vehicle there is a navigation device 4 for guiding a vehicle in a road network. Navigation device 4 features a positioning device 5, which advantageously facilitates a position determination via a GPS (Global Positioning System). Navigation device 4 is connected to a display device 1, which is advantageously implemented as a liquid crystal display. In addition to display 1 there are operational elements, for example in the form of rotary knobs and/or pushbuttons. Alternatively or in addition, touch-sensitive display areas 2 may be available, so that certain functions may be initiated by using a touch screen.

Display 1 may show selection menus for controlling navigation device 4, in particular close destination may be input using the selection menus. A computational unit which determines a driving route to a close destination entered based on a map database 8, starting from the instantaneous position of the vehicle determined by positioning device 5 is integrated in navigation device 4.

Figure 2:
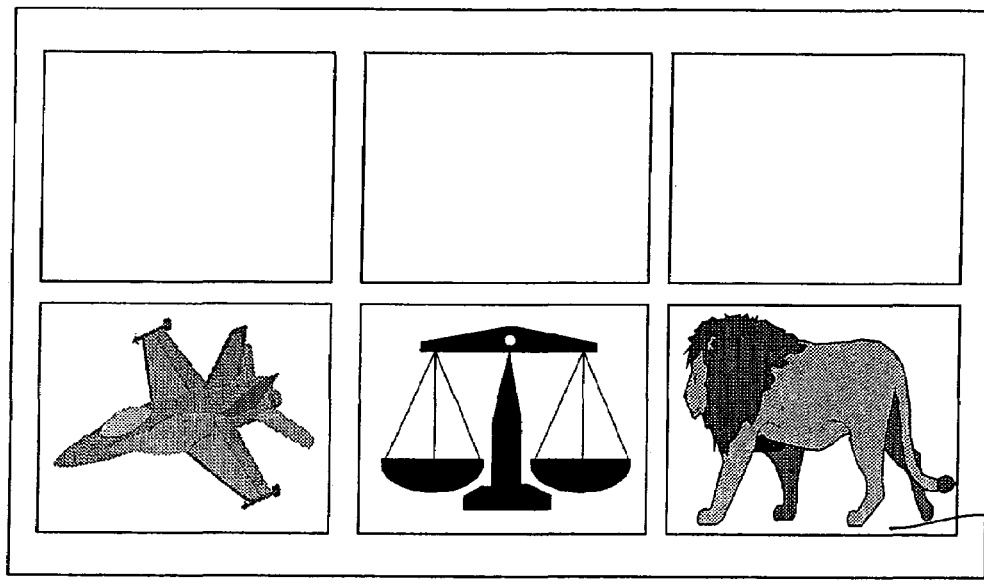
FIG. 2 shows a detail shot of a touch screen.

In the case of the destination input according to the present invention, a selection menu will be displayed to a user after setting a close destination input mode, via which the user is able to retrieve the close destination input. A corresponding illustration using symbol keys 12 is shown in FIG. 2. Using softkeys, the user's own symbols or terms may be stored for entering a defined close destination. As in the figure, symbols for an airport, a court building, or a zoo may be depicted. Likewise, trademarks or the name of a company may be displayed, so the user will be directed to a branch of the company. Entering the city or the administrative area in which the infrastructure facilities are located, represented by the symbol keys, is not necessary, since the method according to the present invention provides that, based on the determined position, the desired infrastructure facility is assigned to that administrative area in which the vehicle is located at the time of entering the close destination. If a trademark symbol is displayed, the administrative area may also be a trading area assigned to a branch of the company. Advantageously, upon turning on the close destination input mode the determined city is displayed or conveyed acoustically to the driver as a confirmation.

Figure 3:
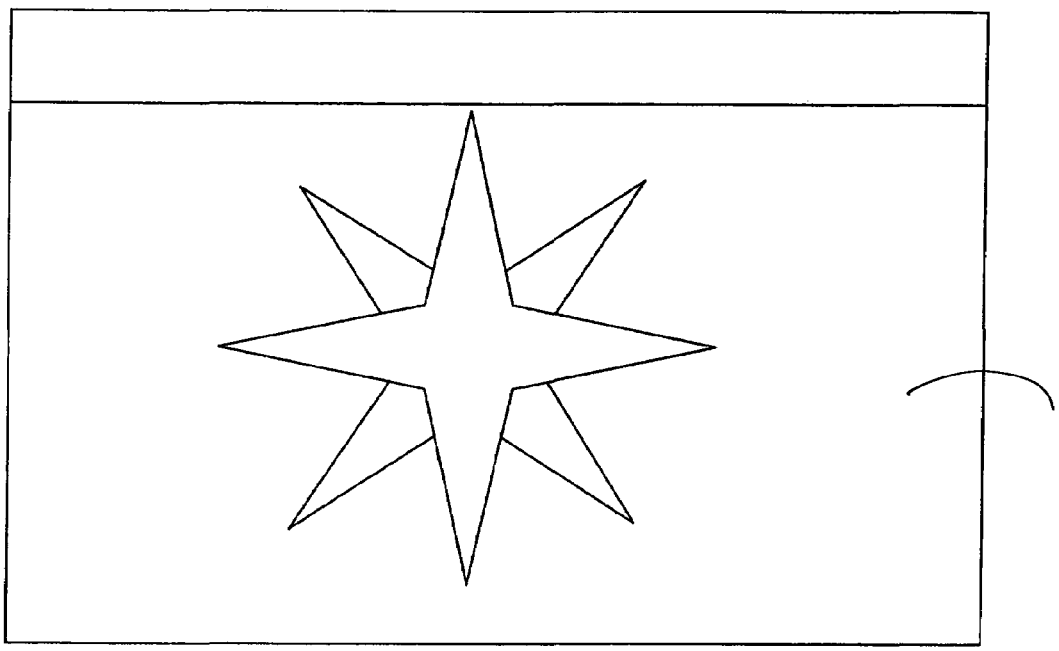
FIG. 3 shows a display area.

The display of the determined administrative area or the city will be shown in a status line 11, as represented in FIG. 3. In the case of a non-unambiguously defined close destination, for example in the case of several identical infrastructure facilities, a query is performed preferably by entering a direction, in which the desired close destination is supposed to be located. The direction may be defined in this manner, as represented in FIG. 3, for example using a wind rose represented in the display and a corresponding touch on touch screen 1. Acknowledgment of the input may be provided acoustically by a speaker 7 according to FIG. 1. An additional operating unit 9 may be available on navigation device 4, in order to be able to perform appropriate input. Likewise, an interface, for instance a mobile wireless interface, is provided in order to retrieve up-to-date information from a service center during the ride.

Figure 4:
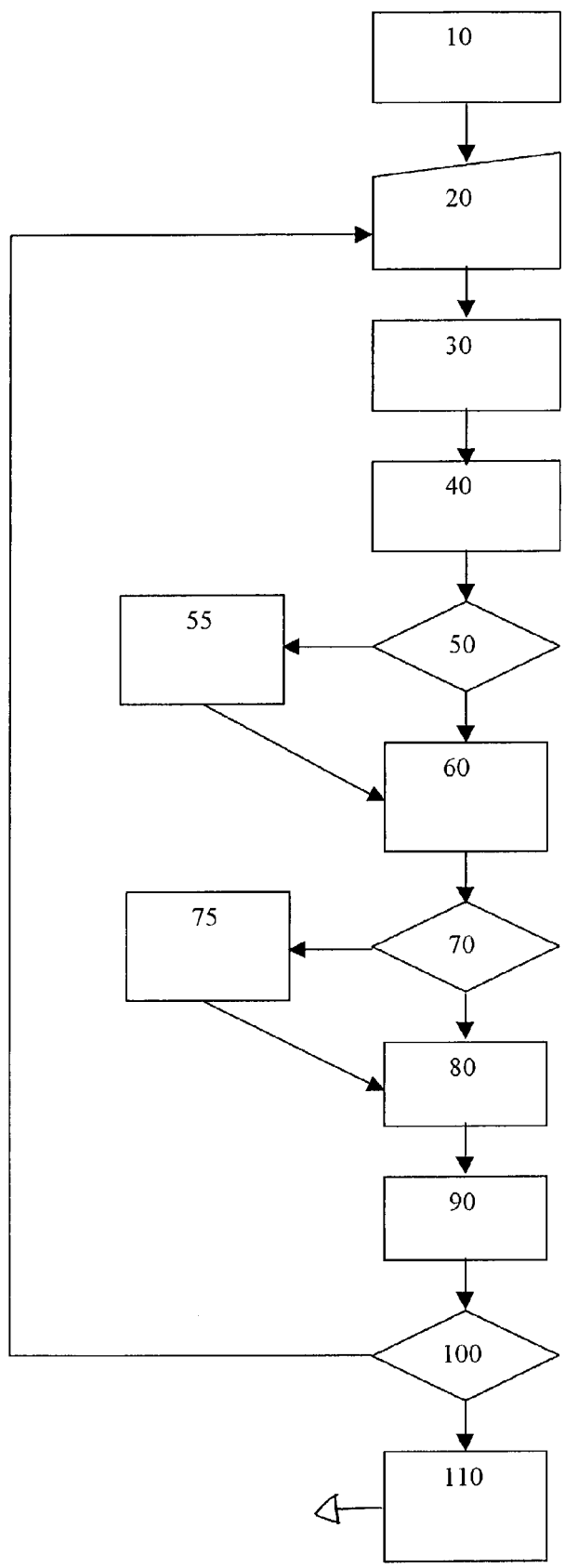
FIG. 4 shows a flow chart of a method sequence.

FIG. 4 shows an example of a method sequence. In Step 10 navigation device 4 is initialized for example by operating unit 9, i.e., the close destination input mode is initialized. In Step 20 the close destination is input by pressing a key or touching a button on a touch screen. Subsequently, in Step 30 the position of the vehicle is determined using positioning device 5, for instance via GPS. Based on the determined position, the vehicle is assigned to an administrative area, for instance to a city.

Subsequently, in Step 50 the query is performed whether the administrative area is unambiguous or whether the vehicle is located in a boundary area to another administrative area. In the event the position is not unambiguous, a query will be performed in Step 55 regarding the desired administrative area and upon a corresponding input in Step 60 the close destination is determined. The close destination in Step 60 is determined immediately in the case of an unambiguous administrative area.

Subsequently, in Step 70 the query is performed whether the entered close destination is unambiguous, i.e., whether there are several close destinations under the corresponding symbol in the administrative area. In the case of a non-unambiguous close destination or in the case of several possibilities, a query and narrowing down will be performed in Step 75; as soon as a specific close destination is determined, the driving route from the determined instantaneous position of the vehicle to the desired destination will be established in Step 80, i.e., to the close destination in the appropriately determined city. Advantageously, in Step 90 a confirmation of the route is issued, preferably acoustically, in order to distract the driver as little as possible from the driving activity.

In Step 100 a query is made whether the input was correct and in the event this is the case, the driving instruction is issued in Step 100, until the determined destination has been reached. In the event the input was wrong, the sequence returns to Step 20 and the method is run again.

A useful application is for example when there is no time for a complex destination input leaving the freeway, for example, for touristical reasons. Likewise, in the case of a spontaneous decision to leaving the freeway, a sometimes complicated input of the desired destination is not always feasible. By selecting, for example, the symbol for downtown, a driver will be guided without any further input to the downtown area associated with the freeway exit.

Conversely, in order to find a freeway ramp, it is only necessary to select the symbol for "freeway" to be guided automatically to the nearest junction. In the event there are several junctions available, the selection may be limited effectively by providing the direction (N, S, E, or W). In the event only the nearest or most rapidly reachable freeway is to be headed for, entering the direction (N, S, E, or W) is not necessary; this is of advantage particularly when the user does not yet know his destination when he starts driving.

After a driver has made a decision for the close destination input mode, first he is informed in which administrative area or in which city he is located. If the driver now selects the symbol key "freeway," it is checked whether the input is unambiguous. In the event several possibilities come up to reach the freeway, at least a rough idea about the direction is obtained by the driver performing a direction query. The input of the nearest freeway, for example westbound, is confirmed to the driver via a corresponding, preferably acoustic output and the shortest or fastest driving route is calculated. Driving instructions to the driver are issued until the freeway is reached. Subsequently, an indication is issued to the driver to the effect that no further destination data is available and that guidance by the navigation system is terminated for now.

Now if the driver wishes to leave the freeway at a road sign, he may select the downtown area for example. The driver will now be guided along a parking facility route to a parking facility close to the downtown area and, if necessary, the availability and parking capacity of the parking facilities are retrievable via mobile wireless interface 6. After reaching a vacant parking space, the vehicle is parked and the navigation is terminated.

An advantageous refinement of the present invention provides for the symbol keys or the selection menus to be adjusted as soon as the vehicle is located in an appropriate administrative area. In this way, for example, special sightseeing points in different cities may also be included, so that locating a church, a museum, or another point of interest is made easier. The corresponding data is stored in map database 8 of the navigation device and is retrieved within the scope of determining the instantaneous vehicle position. In this manner a simple and adjusted navigation and driving route determination are made possible whereby driving of the vehicle is made easier overall.

What is claimed is:

1. A method of determining a driving route of a motor vehicle using a navigation system, comprising:
   inputting a close destination;
   automatically determining an instantaneous vehicle position;
   making an assignment to an administrative area in which the vehicle is located, as a function of the vehicle position;
   subsequently ascertaining the driving route to the close destination in the assigned administrative area; and
   making a query regarding a final selection, when a clear destination is not precisely entered, wherein the query prompts for a direction in which a desired close destination is located.

2. The method according to claim 1, wherein the close destination is input using one of symbol keys and selection fields of a menu structure, by specifying at least one of a street name and a designation of an infrastructure facility.

3. The method according to claim 1, further comprising determining the driving route for one of a nearest and a most rapidly reachable close destination.

4. The method according to claim 1, further comprising, in a boundary area of an administrative area, making a query regarding a desired administrative area.

5. The method according to claim 1, wherein the driving route is ascertained, which is located along a stretch having a plurality of parking facilities.

6. The method according to claim 1, further comprising setting a closed destination input mode, prior to inputting the close destination.

* * * * *